April 7, 1931.  C. H. TOWERS  1,799,333
NUMBERING AND DATING ATTACHMENT FOR ADDING
MACHINES AND SALE AND CASH REGISTERS
Filed Dec. 6, 1922  5 Sheets-Sheet 1

April 7, 1931.  C. H. TOWERS  1,799,333
NUMBERING AND DATING ATTACHMENT FOR ADDING
MACHINES AND SALE AND CASH REGISTERS
Filed Dec. 6, 1922   5 Sheets-Sheet 2
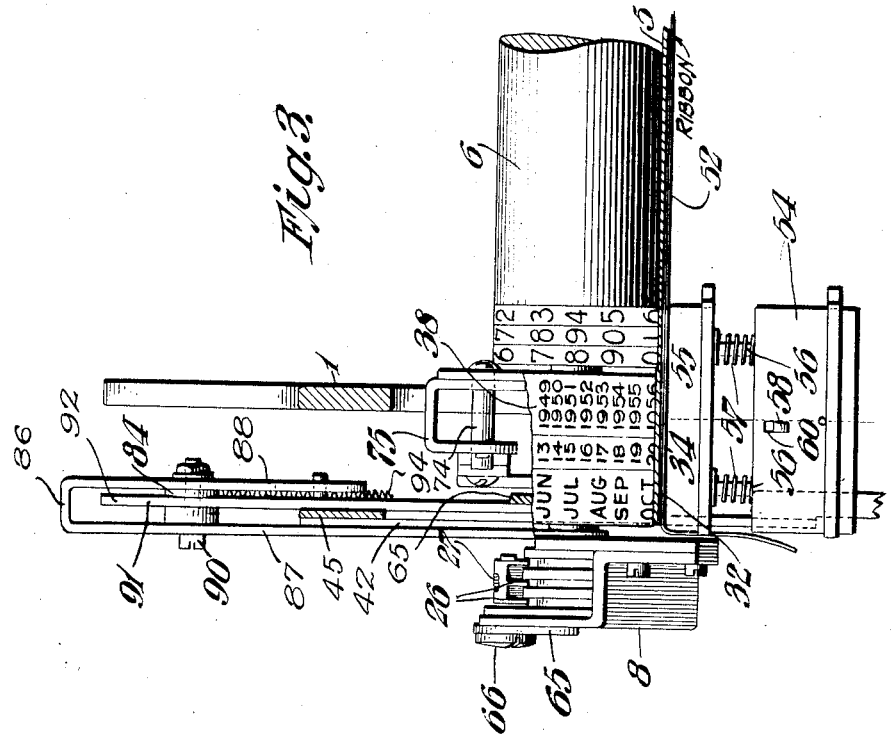

April 7, 1931.   C. H. TOWERS   1,799,333
NUMBERING AND DATING ATTACHMENT FOR ADDING
MACHINES AND SALE AND CASH REGISTERS
Filed Dec. 6, 1922   5 Sheets-Sheet 3
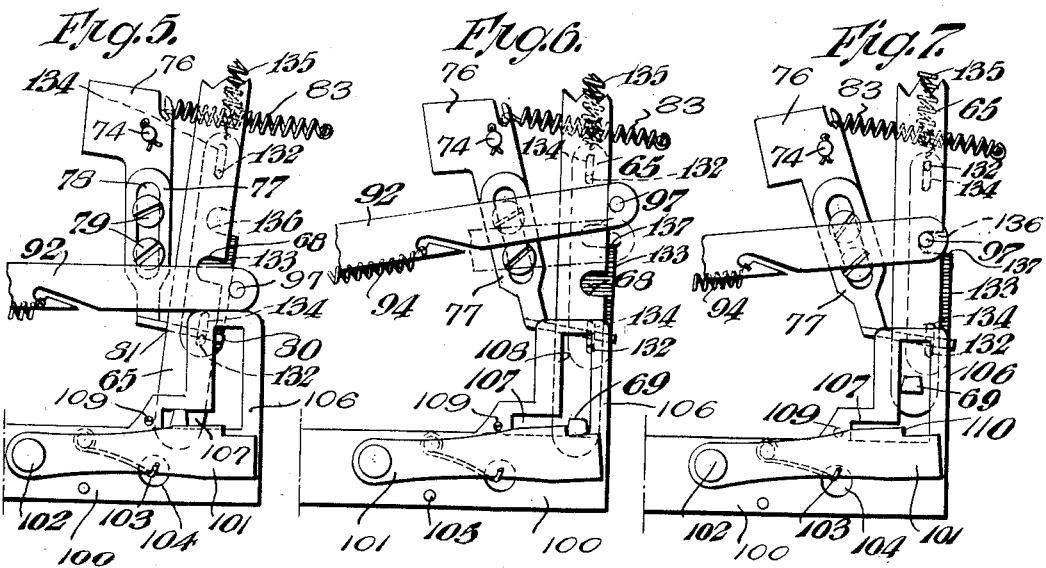
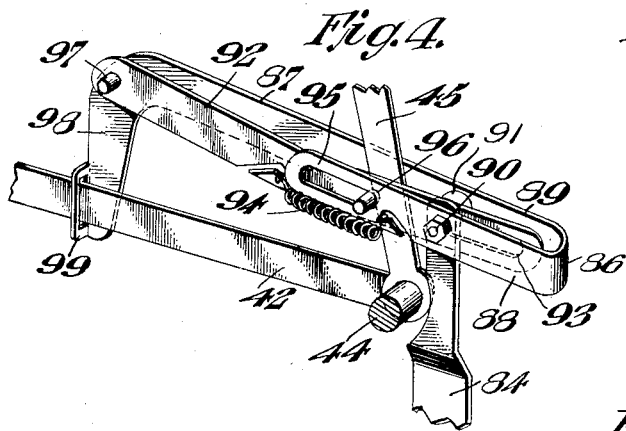
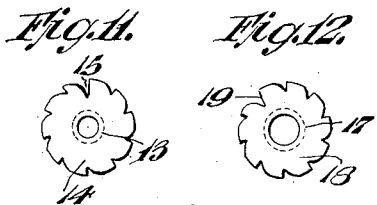
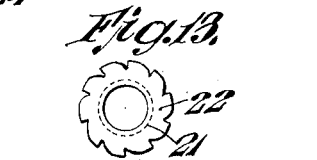
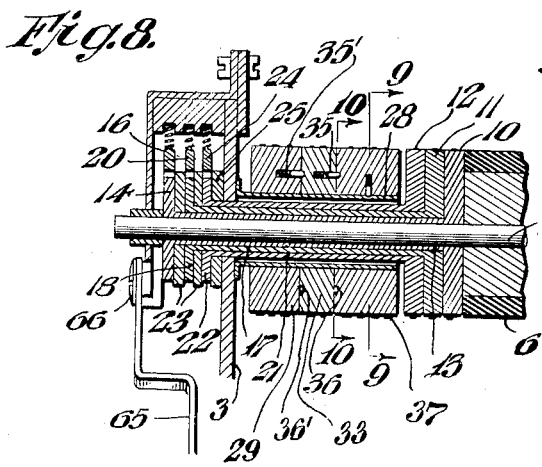
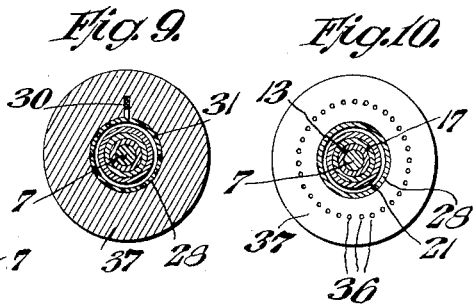

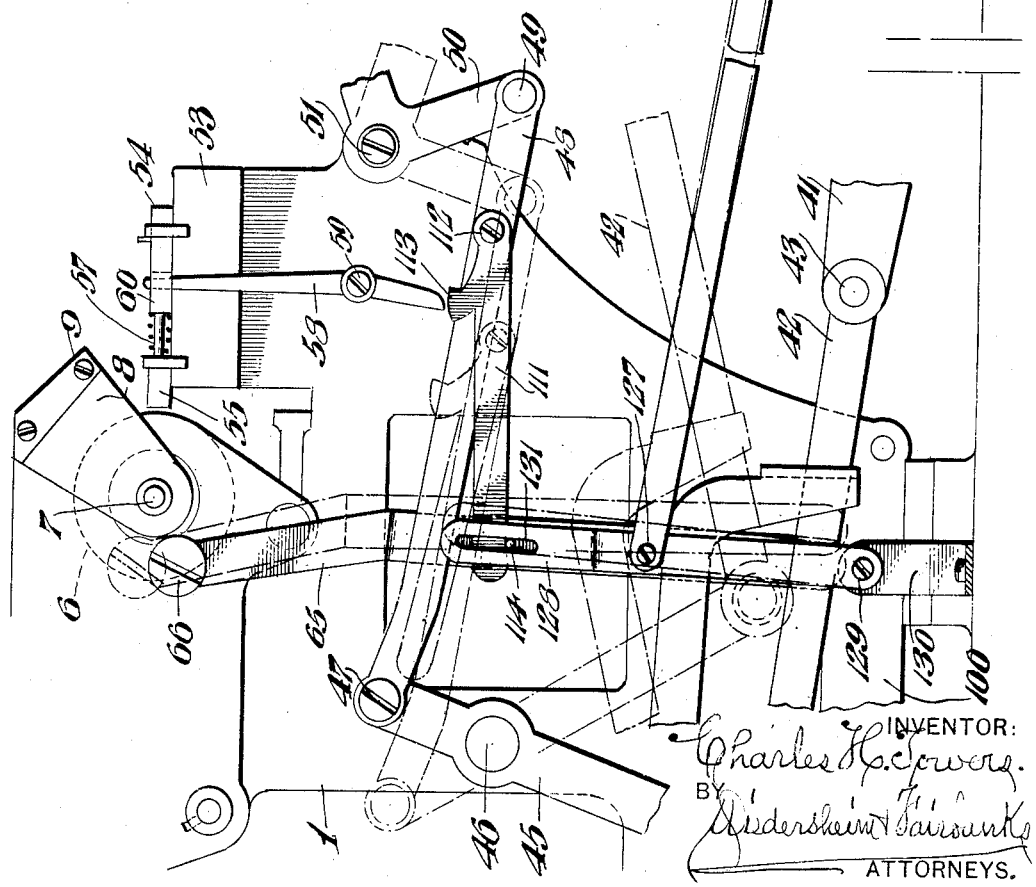

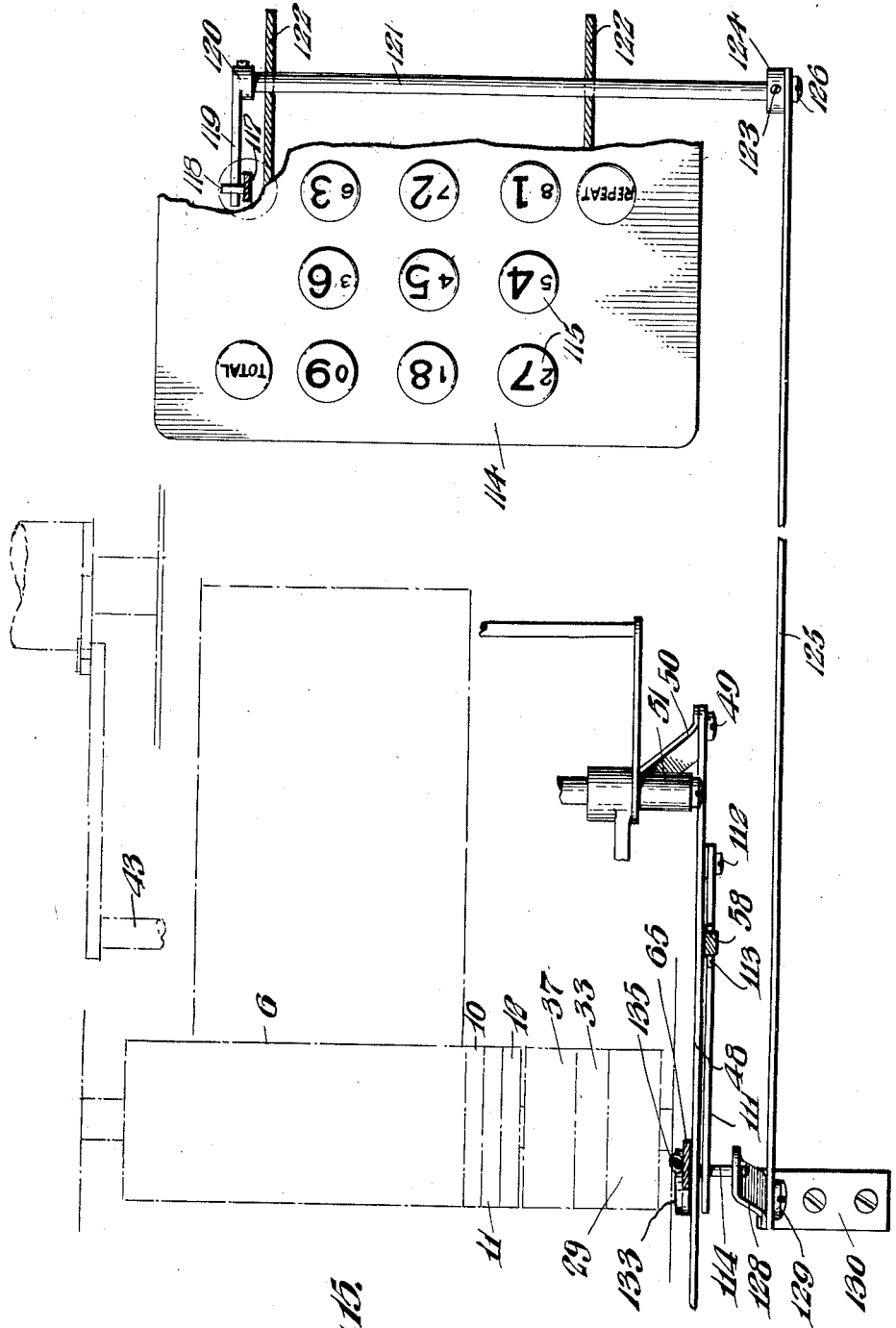

Patented Apr. 7, 1931

1,799,333

UNITED STATES PATENT OFFICE

CHARLES H. TOWERS, OF HADDONFIELD, NEW JERSEY, ASSIGNOR TO THE NATIONAL CASH REGISTER COMPANY, OF DAYTON, OHIO, A CORPORATION OF MARYLAND

NUMBERING AND DATING ATTACHMENT FOR ADDING MACHINES AND SALE AND CASH REGISTERS

Application filed December 6, 1922. Serial No. 605,144.

My invention has reference to adding machines and more particularly to a novel and useful construction and arrangement by which, during the operation of the machine to print one or more items on a strip or sheet of paper, it may be caused to print the number and date of such item or series of items, constituting the amount of a sale, so that the items or series of items taken collectively, and thus, the totals, such as the sum totals of the amounts of each item, may be consecutively numbered and the dates thereof given as a matter of record and aid to keeping accounts.

My novel invention further comprehends numbering and dating mechanism for adding machines, in the form of an attachment for adding machines, which co-operates with the mechanism of the machine and is operative jointly therewith to advance the printing mechanism of the consecutive numbering means after the printing of each item or the total of a number of items and its number, and to print the date of the entry or sale to which the item refers, alongside of or in any desired or convenient relation to such item, or a series of items or sum total thereof, thus giving a printed sales slip and a printed record on the sales slip by the same machine, showing the date of the sale or transaction, denoted or designated by the printed record of the item or items and the number or other consecutive identifying character according to the numerical or other order of the transactions, as a facility in bookkeeping and accounting.

According to a custom at present practiced, it is common in stores for the salesman or clerk to write down the prices of the various articles or goods dispensed and add the price or sales items, and then issue a sales slip or check from and by the operation of a sale and cash register, or the like, which slip is presented to a cashier on paying or making settlement for the purchase, and a duplicate printed record is left in the machine produced upon a separate strip, sheet or tape or part thereof from which the sales slip or check is torn or separated and issued to the customer or purchaser. However, it often happens that mistakes are made by the salesman in making additions or totals of the sales prices or in figuring the transactions or exchanges, which mistakes or errors may be to the advantage or disadvantage of the customer or storekeeper, with consequent losses or disagreements, and loss of customers.

It is therefore among the objects of the present invention to overcome the objections above referred to, and to permit the salesman to record and print a record of the individual items of straight or single article sales or transactions, or the sum of a series of items, the adding operations being carried out on the machine in its usual manner of operation and the novel structure or attachments in combination with the mechanism of the adding machine, serving to consecutively number and to date each printed series of items collectively, thereby not only avoiding mistakes in additions and insuring the proper amount on the sales slip or check, but dating and numbering them so that any particular slip may be located, or the total sales for a given period quickly and accurately obtained.

While my novel invention is particularly adapted for use in connection with adding machines, and is shown applied to the "Sundstrand" machine such, for instance, as shown in reissue Patent No. 14,237, dated December 16, 1916, it is to be understood that I do not limit myself to such use, and that the principles and combinations are equally applicable to other types of adding machines, sales and cash registers, or other machines which are adapted to print or record one or more items, with or without totaling the same, and issuing a slip or check with the items printed thereon to be handed to the customer, while a strip or tape from which the slips are severed, or separate therefrom, may be retained in the machine, and therefore I do not wish to be limited to the embodiment shown and described, but desire to be understood as including within the scope of the invention such other or similar adaptations than the embodiment shown and described.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized, and that my invention is not limited to the precise arrangement and organization of these instrumentalities as herein shown and described.

Figure 1 represents a side elevation of a fragmentary portion of the framework of an adding machine with the consecutive numbering and dating mechanism applied thereto in conjunction with the parts with which it cooperates.

Figure 2 represents a fragmentary vertical sectional elevation taken on the section line 2—2 of Figure 1.

Figure 3 represents a top plan view of the parts shown in Figure 2.

Figure 4 represents a fragmentary perspective view of a part of the structure for operating the numbering mechanism.

Figure 5 represents a fragmentary side elevation showing the operative connections between the adding mechanism, and the number advancing mechanism, with the parts in their normal positions.

Figure 6 represents a view similar to Figure 5 but with the parts in positions which they assume upon the printing of a total, and prior to the advancing of the numbering mechanism.

Figure 7 represents a view similar to Figures 5 and 6 but with the parts in positions taken when the numbering mechanism is being advanced, and prior to the printing of another item or series of items.

Figure 8 represents an axial sectional view of the platen of the adding machine at one end, with the numbering and dating device applied thereto.

Figure 9 represents a cross sectional view taken on the section line 9—9 of Figure 8.

Figure 10 represents a cross sectional view taken on the section line 10—10 of Figure 8.

Figures 11, 12 and 13 represent side views of ratchet wheels employed in and forming a part of the number advancing mechanism.

Figure 14 represents a fragmentary side elevation corresponding to Figure 1, but showing a modified embodiment of the number and date printing means.

Figure 15 represents a top plan view showing the modified embodiment of the number advancing mechanism which is operated under control of the "total" key.

Similar numerals of reference indicate corresponding parts.

Referring to the drawings.

1 (Fig. 1) is the framework, 2 the base, 3 the carriage preferably stationary and having a support 4 for a roll of paper 5 which is passed under a cylindrical platen 6 rotatably mounted or positioned on the carriage 3, for the printing of the items thereon, in one or more columns, but preferably two, in the usual manner as shown and described in the patent above referred to. The shaft 7 of the platen 6 is rotatably mounted in the carriage 3 at one end and in an angular bearing bracket 8 at the other end, said bracket 8 being secured at 9 to the outside of one side plate of the carriage and is offset outwardly therefrom.

On the shaft 7, at one end of the platen 6, are a number of printing disks or rollers bearing numeral types from 1 to 9 and (zero) 0 inclusive on the peripheral faces thereof; three of such disks 10, 11 and 12 (Figs. 2 and 8) being shown in the drawings, for the units, tens and hundreds columns respectively, or further if desired. The arrangement shown is adapted to register or be advanced and print, from (zero) 0 to 999, as a limit of the number of consecutive transactions to be recorded, as within a given or predetermined period, but while three of such disks are shown, it is to be understood that any number of such disks may be employed, as desired or necessary, without departing from the spirit of the invention.

The disk 10 is fixed to a tubular shaft 13 (Figs. 8 and 10) rotatable on the shaft 7 and extending beyond the side of the carriage provided with the bracket, while the side of the carriage has an aperture of larger diameter than the shaft 7, through which the tubular shaft 13 is disposed. A ratchet wheel 14 (see also Figs. 1 and 11) is rigid with the outer end of the shaft 13 and has ten ratchet teeth and a corresponding number of intervening notches, including a deep notch 15, adapted to be engaged by a spring pawl 16 to prevent reverse or backward rotation thereof. The disk 11 is fixed to a tubular shaft 17 adapted to turn on the shaft 13, and has a ratchet wheel 18 (see also Fig. 12) rigid on its outer end but spaced from the ratchet wheel 14, the ratchet wheel 18 also having ten teeth and notches, including a deep notch 19, but the notches of the ratchet wheel 18 are deeper than the notches of the ratchet wheel 14 for a purpose to be hereinafter explained, while a pawl 20 engages the teeth of the ratchet wheel 18 to prevent backward rotation thereof. The disk 12 is fixed to a tubular shaft 21 adapted to turn on the tubular shaft 17, and has a ratchet wheel 22 (see also Fig. 13), rigid on its outer end but spaced inwardly from the ratchet wheel 18, spacers 23 being provided between the three ratchet wheels to permit their independent action and to take up end thrust.

The ratchet wheel 22 also has ten teeth and notches, but all of the notches are of the same depth and are of less depth than the notches of the ratchet wheel 18, and a pawl 24 engages the teeth of the ratchet wheel 22 to prevent its backward rotation. A spacer 25 is provided between the ratchet wheel 22 and the adjacent side of the carriage 3.

It will thus be seen that the tubular shafts 13, 17 and 21, are arranged to revolve on one another and are concentrically mounted on the platen shaft 7 so that the discs 10, 11 and 12 may be independently turned or stepped, the hundreds disk advancing one step or numeral for each complete revolution of the tens disk and the tens disk advancing one tooth or numeral for each complete revolution of the unit disk. To accomplish this action, a series of pawls 26 (Figs. 1 and 3) are provided, the pawls being integral and each adapted to coact with one of the ratchet wheels 14, 18 and 22. The pawls are held against the teeth by a suitable spring 27 and when the pawls are actuated, one of the teeth of the ratchet wheel 14 is engaged to advance this ratchet wheel and its disk, one tooth, so as to advance the disk one step or numeral at a time. During this operation, the pawls are out of engagement with the teeth of the ratchet wheels 18 and 22 and until the pawl coacting with the ratchet wheel 14, drops into the notch 15, the ratchet wheels 18 and 22 will remain stationary, as will also the disks 11 and 12. Upon engagement of the pawl with the notch 15, the adjacent pawl will be permitted to drop into the teeth of the ratchet wheel 18 and advance it one tooth, thus stepping the disk 11 to present the next numeral in position for the printing operation.

When the pawl coacting with the ratchet wheel 18, drops into the notch 19, a pawl will engage the teeth of the ratchet wheel 22 and advance it and the disk 12 one step. By this means, the tens disc 11 will be advanced one numeral for each complete rotation of the units disc 10, and the hundreds disc 12 will be advanced one numeral for each complete rotation of the tens disc 11, thus advancing the corresponding numbered printing devices decimally and consecutively for each printing operation, or each time an item or series of items is printed as will be hereinafter set forth. A tubular support 28 (Figs. 8, 9 and 10) is secured to the adjacent side of the carriage 3 and projects inwardly around the outer tubular shaft 21 so that the shafts may freely turn therein.

Upon the tubular support 28, a disc 37 is mounted, said disc having an aligning spring pawl or detent 30 as seen in Figures 8 and 9 of the drawings, to engage any one of twelve equi-distant aligning apertures or recesses 31 in the tubular support 28. The periphery of the disc 37 is provided with type or other character representations designating the years of the century, as indicated at 38 (Fig. 3), and the radial aligning detent or pawl 30 is adapted to engage the apertures 31, when manually turning the disc 37, to present any one of the gears as represented by the type in abbreviated or other form, in accurately aligned position in front of the platen for the printing operation.

A disc 33 is also mounted to turn on the tubular support 28 outwardly of the disc 37, and contacts therewith. The disc 33 has its periphery provided with type designating the days of the month from 1 to 31, as indicated at 34 (Figs. 2 and 3), and carries a spring pawl or detent 35 parallel to the axis thereof, to engage any one of the aligning series of notches, recesses or seats 36 in the adjacent side face of the disc 37, as seen particularly in Figures 8 and 10 of the drawings. There are thirty-one notches 36, one for each day of the month, so that by manually turning the disc 33, and causing the aligning detent in pawl 35 to engage and seat in one of the notches 36, any one of the days of the month may be presented in alignment at the front of the platen for printing operation in conjunction with the months of the year. The disc 33 is provided with a corresponding number of notches 36 and is engaged by a corresponding pawl 35' carried by a disc 29 also mounted to turn on the tubular support 28 outwardly of the disc 33, and bearing on its periphery the designations in type, of the months of the year, as indicated at 32, so that the type designating the proper year may be presented at the front of the platen in connection with the other designations, to give a number and a date for each transaction or item printed.

In order to actuate the consecutive numbering printing device to advance it one unit for each total printing operation, so that the series of items may be consecutively numbered, an attachment is provided to co-operate with certain parts of the machine shown generally in the accompanying drawings but particularly illustrated and described in the prior patent above alluded to. In this connection, 39 (Fig. 1), designates a shaft corresponding to the main rock shaft of the adding and listing machine shown in the patent referred to and adapted to be rocked in its bearings 40 positioned upon the base 2 of the framework, through the medium of the usual handle or crank, or in any other suitable manner well known in the art. 41 designates an arm fixed to the shaft 39 and to the free end of which a link 42 is pivotally connected, as indicated at 43, the other end of the link being pivotally connected at 44 to a lever 45 pivoted at 46 to one side of the framework. The longer arm of the lever 45 extends downwardly and the short arm extends upwardly and is pivotally connected at 47 to a link 48 extending forwardly and pivotally connected at 49, to the adjacent arm of a bellcrank lever 50 which is pivoted at 51 to the adjacent side of the framework of the machine and is adapted to actuate the hammers and other parts of the printing mechanism of the machine as fully set forth and described in the Sundstrand patent above referred to.

The item printing mechanism of the machine includes the platen 6 (Figs. 1 and 14), the type carrying plungers of which there are 10 in number and each adapted to print from naught to nine and zero, beginning with zero at the top, then one and so on, a ribbon 52, (Fig. 3), the hammers and the hammer operating mechanism adapted to make an impression upon the paper according to the transaction or amount which the machine is set by operation of its keys, to print or otherwise record, and in accordance with the present invention, the ribbon 52 is extended across the length of the platen in front of the numbering and adding characters and fed from one ribbon spool to the other as the machine is successively operated. In printing the items, the impression is made upon the paper by contact of the type plungers with the front of the ribbon and against the platen, the paper being interposed or passed between the platen and the ribbon. In connection with the numbering and dating means, the characters or type appear on the discs of the platen or extension thereof, and since the paper is disposed between the type and the ribbon, the impression is produced from in front of the ribbon. For this purpose, the framework is provided with an upward extension 53 (Fig. 1) in front of the platen and arranged thereon is a slide 54 provided with an impression block 55 (see also Fig. 3) adapted to move or reciprocate horizontally therewith toward and away from the platen at right angles to its axis. The impression block 55 has plungers 56 movable relatively to the slide 54 and around which expansible springs 57 are mounted between the slide and the impression block to normally hold the impression block toward the platen but adapted to resiliently give in order to cushion the impact of the impression block against the type or characters of the numbering and dating discs with which it cooperates.

In order to actuate or reciprocate the slide 54, a lever 58 (Fig. 1) is pivoted at 59 and its long arm extends upwardly and engages a slot or opening 60 in the slide 54. A catch 61 is pivoted on the link 48 as indicated at 62 and is pressed upwardly by a spring 63 carried by the link, the upward movement of the catch 61 being limited by contact with a pin or stop 64 fixed to the link 48 above the catch. The catch 61 is adapted to engage the lower end of the lever 58 or short arm thereof and snap by the same on the rearward movement of the link 48 so as to pass in rear of the lower end of the lever 58. However, when the link 48 moves forwardly, owing to the catch 61 having been pressed upwardly by the spring 63, the catch will engage in back of the lever 58 and swing it on its pivot 59 to move the slide 54 and the impression block 55 rearwardly, which latter will be moved against or caused to strike the inking ribbon 52 and force it against the paper 5 with pressure against the platen or that part thereof constituted by the numbering and dating disks 10, 11, 12, 29, 33 and 37, thus printing such data or identifying characters on the paper or slip torn therefrom, according to the aligned characters of the disks in position at the front part of the platen or printing roller, to be printed. In this construction, the block 55 forms a bed or platen and the type arrangement is reversed in comparison to that of the item printing means of the adding machine proper. Thus, each time the crank or handle of shaft 39 is pulled or swung forwardly as shown in dotted lines in Figure 1, the link 48 is moved rearwardly and catch 61 engages in rear of the lever 58, so that when the crank handle is released to move or swing rearwardly in the usual manner of operation of the adding machine to cause the printing operation as described in the above mentioned patent, the link 48 and catch 61 will move forwardly to actuate the lever 58 and print the date and number of the series of items on the paper, simultaneously with the printing of the items, totals or otherwise.

In advancing or changing the date printing means to advance or change the date to be printed, the year disk 37 is turned to position the proper year in printing position horizontally at the front of the platen, the spring pawl or detent 30 being frictionally disengaged and automatically snapping into the holes or apertures 31 to hold the disk 37 in the desired position or against movement or turning on its stationary tubular support 28, when once adjusted. The disks 33 and 29 will turn with the disk 37, but may each be independently, as well as simultaneously turned with or independently, of the disk 37, by manually turning them on the stationary tubular support 28, the spring pawls or detents 35 and 35' will engage and disengage the notches 36 and 36' in the adjacent side faces of the disks 37 and 33, respectively to hold the disks 33 and 29 in adjusted positions. Since 31 seats or notches 36 are provided in the disk 37, the disk 33 may be adjusted to hold any one of the type characters designating the days or dates of the months, designated at 34, in position to be printed. There are as many notches 36' as there are markings on the disk 29 to designate the month or months of the year, so that the same may be advanced monthly and held in adjusted position, while all of the disks are held stationary with the disk 37 on the tubular support 28. The dating mechanism is therefore manually adjusted as desired, independent of the consecutive numbering mechanism, and may be simply constructed and easily set.

In order to advance the consecutive numbering mechanism by actuation of the pawls 26 as heretofore described, a bar 65 is pivoted at 66 to an arm 67 (see Figure 1) to which the body of the pawl 26 is fixed, the upper end of the bar being offset outwardly and angularly bent rearwardly, as clearly shown in Figure 2 of the drawings. The bar 65 extends downwardly into proximity of the base of the machine, having the lower end thereof free, being provided with a notch 68 in the front edge thereof at a point above the lower end, and being provided with an outwardly projecting lug or stud 69, preferably of rectangular cross section, near the lower end thereof. An outwardly or laterally projecting pin 70 (Fig. 1), is fixed to a vertically movable element of the printing mechanism, such as the side member 71 corresponding to the side members 199 of the rigid frame in said Sundstrand patent, or other suitable part or element which moves vertically for a short distance and in an upward direction, upon the depression of the total key and the actuation of the crank handle in the operation of the machine to print the totals, as is well known in this art. An upright bracket support 72 (Fig. 2), is rigidly secured as at 73 to the framework 1 of the machine and carries a pivot 74 on which a finger 75 is pivoted intermediate its ends, the finger being disposed above the pin 70 and having a downward extension 76 to which a slide 77 is connected for vertical adjustment. For this purpose, the slide 77 is slotted as indicated at 78 and screws 79 are disposed through the slot and engaged with the downward extension to clamp the adjustable slide in vertically adjusted position. The lower end of the slide 77 is provided with a horizontal foot-piece 80 extending forwardly against the inner face of the bar 65, the foot-piece having a recess 81 on the outside, receiving the bar 65 therein and forming shoulders engaging or straddling the front and rear edges of the bar to swing or oscillate the bar upon swinging of the finger 75. As before stated, upward movement of the side member 71 and pin 70 in engagement with the bottom edge of the finger 75, will swing the forward extension or free end of the finger upwardly and thus swing the foot-piece 80 and bar 65 forwardly from the full line position shown in Figure 1 of the drawings to the dotted line position shown therein. A contractile coil spring 82 connects the pin 70 with the framework above the pin and serves to normally move and hold the member 71 up when the ribbon is shifted after depression of the total key, although it is to be understood that the invention is not limited to the mounting of the pin upon the particular element 71, as set forth, and illustrated as a preferred embodiment in the application of the invention to the particular type of ten key adding machine shown and described. A contractile coil spring 83 connects the finger 75 above the pivot 74 to the framework and in addition to holding the free end of the finger against the pin 70, also normally swings the lower end of the finger-extension and foot thereof rearwardly as well as the bar 65, for a purpose to be hereinafter more fully set forth. The finger 75 is illustrated as a substantially U-shaped or rebent piece or member with two spaced portions or bearing points on the pivot 74 to offset the downward extension in an outward position to permit the foot to engage or receive the bar 65, but the construction of the finger may be varied so long as it accomplishes the objects specified.

An upright bracket 84 (Fig. 2), is rigidly mounted at 85 on the base 2 of the framework 1 and pivoted to the upper end thereof, is a rebent end 86 of a lever 87, (Figs. 3 and 4), said rebent end 86 having spaced inner and outer sides 88 and 89 receiving a pivot 90 therethrough near one end of the lever, on which is mounted a spacing sleeve or washer 91 and between the upright bracket and the spacer or spacing sleeve, a bar 92 is mounted, the bar having a longitudinal slot 93 near one end to permit longitudinal movement thereof relative to the lever and the pivot. A contractile coil spring 94 connects the bar 92 with the inner portion of the lever 87, and since the lever 87 is held from longitudinal movement on the pivot, the bar 92 will be held normally rearwardly displaced with the forward end of the slot 93 engaging the pivot, as seen more particularly in Figure 4 of the drawings. In addition to the slot 93 and pivot 90 limiting the longitudinal movement of the bar 92, the inner side 88 of the lever 87, which is shorter than the outer side 89, is provided near its forward end, with a longitudinal slot 95 engaged by a guide and stop pin 96 projecting inwardly from the bar 92 intermediately of its ends, to cooperate therewith, and in conjunction with the other slot and pin, to slidably support the bar for longitudinal movement and slight pivotal movement owing to the play allowed the pins in the respective slots, to compensate for the pivotal action of the lever 87, as will be hereinafter more fully described. A pin 97 projects inwardly from and is rigid with the bar 92 near its free end and forms a detent to co-operate with and engage the notch 68 in the pivoted bar or connecting rod 65, so that the bar 65 may be elevated at the proper time, to advance the consecutive numbering and printing mechanism after the taking of a total. The forward end of lever 87 has a downward extension 98 provided with a loop 99 extending inwardly or laterally to slidably receive the link 42 therein, so that when the link is actuated by swinging the crank handle in the manipulation of the machine, upward movement will be imparted to the lever 87 for a purpose which will presently appear. The bracket 84 is provided with a horizontal bar 100 (Figs. 5, 6 and 7) on which a detent 101 is pivoted at its rear end as indicated at 102, so as to have vertical pivot movement against the outer face of the horizontal bar 100, which latter is disposed vertically on edge as seen more particularly in Figure 1 of the drawings. The detent 101 is urged upwardly by a spring 103, extending through the aperture 104 in the bracket portion 100, and is normally limited in its upward movement by a stop pin 109 projecting outwardly from the portion 100 of the bracket 84, while the downward movement of said detent 101 is limited by a stop pin 105 projecting outwardly from the face of the bracket portion 100. The bracket bar 100 is further provided with an upright forward end 106 having a right angular slot including a horizontal rearward extension 107 and a vertical portion 108 connecting with the forward end thereof. The rearward movement of the bar 65 on its pivot 66, is limited by the foot-piece 80, in the recess 81, owing to the finger 75 engaging the pin 70 and the outwardly projecting lug or stud 69 extends into the angular slot, and works horizontally and vertically in the horizontal and vertical portions thereof.

In the operation of the device, it may be assumed that the crank handle is normally in a rearward position and the other parts assume the positions shown in full lines in Figure 1 of the drawings, the bar 65 being downwardly disposed and the catch 61 being in front of the lever 58. The bar 65 is also in its rearward position limited by the foot-piece 80, while the stud 69 is positioned near the rear end in the horizontal slot portion 107, as is also shown in Figure 5 of the drawings. Upon depressing the keys of the machine to set up certain items and pulling the crank handle forwardly, the items are printed in the usual way and the dating and numbering means having been properly set upon the disks forming an extension of the platen, as the handle is pulled forwardly the link 48 will move rearwardly permitting the catch 61 to pass the lever 58 and thus upon releasing the handle, it will swing rearwardly under the action of the springs and as the link 48 moves forwardly, the catch 61 will engage the lower end of the lever 58 and cause the impression block 55 to move against the ribbon and thus make an impression or print the characters of the disks upon the paper or strip interposed between the platen and the ribbon. During this action, since the bar 65 is rearwardly displaced and the pin 97 is out of engagement with the notch 68 as seen in Figures 1 and 5 of the drawings, when the link 42 moves upwardly and forwardly to the dotted line position shown in Figure 1, the lever 87 will swing upwardly by reason of its slidable connection with the link 42 through the medium of the loop 99, and pin 97 will move upwardly to the position shown in Figure 6 of the drawings along the forward edge of the bar 65. This is due to the upward movement of the lever 87 on its pivot 90, and since the bar 92 is held rigid with the lever 87, by its slot and pin connection with the pivot 90 and the lever 87, the pin 97 will be prevented from dropping into the notch 68. It is of course to be understood that during these movements, the members 71 will remain stationary and thus prevent the swinging of the finger 75, to impart, by reason of its connection with the bar 65, forward swinging movement to the latter whereby the notch 68 will be positioned to receive the pin 97. However, upon the members 71 moving upwardly upon depression of the total key to record or print a total of a series of items, the pin 70 will engage the free end of the finger 75 and swing it on its pivot 74. This will impart a forward thrust to the foot 80 and thereby swing bar 65 from the full line position shown in Figure 1 to the dotted line position shown in said figure so that the parts will have moved from the position shown in Figure 5 to the positions shown in Figure 6, the pin 97 moving with the lever 87 and the bar 92, to an upward position clear of the notch 68 as shown in Figure 6. The spring 93 normally holds the finger 75 in contact with the pin 70 and thereby retains the bar 65 in a rearward position with lug 69 at the rear end of the horizontal portion 107 of the right angular slot. Obviously, the foot-piece 80 may be adjusted vertically on the downward extension 76 of the finger to vary the movement of the bar 65 on its pivot, that is the arc swung thereby, and to properly position the bar in the recesses 81. During the action above described, the detent 101 is held up by the spring 103 in contact with the lug or stud 69 and the spring 94 holds the bar 92 rearwardly displaced, but limited in its movements by the engagement of the pin 98 with the rear end of the slot 95 and of the forward end of the slot 93 with the pivot 90. By this mounting, the bar 92 is guided in its movements and the pin 97 is positioned to drop into the notch 68 when the bar 65 is moved forwardly as above described, owing to the slight pivoted action allowed the bar 92 on its pivot. Thus, when the printing action takes place after the depression of the total key and the crank handle is swung forwardly to move the bar 65 forwardly to the positions shown in dotted lines in Figure 1 and in Figures 6 and 7 of the drawings, the lug 69 will move forwardly in the slot to move out of the horizontal portion 107 thereof and into the lower part of the vertical portion 108 of the slot and then upon releasing the crank handle, the bar 65 will be held from moving rearwardly while the pin 97 is moving downwardly with the lever 87 and the bar 92 from the position shown in Figure 6, to engage or move into the notch 68 in the manner shown in Figure 7. For this purpose, the detent 101 is provided with a shoulder 110 and as the detent 101 is held up by the spring 103, the lug 69 will seat against the shoulder 110, thus preventing the bar 65 from moving rearwardly when the crank handle is released and the parts move to the full line positions shown in Figure 1. Upon another forward movement of the crank handle during the next item entering operation, the link 42, the lever 87 and bar 92 will again be elevated and the pin 97 being held in the notch 68 will impart upward movement to the bar 65 to advance the digits of the number printing disks through the medium of the decimal ratchet mechanism which connects the bar 65 with the disks as previously described. In this way, the number appearing in printing position upon the disks will be advanced one digit or number after the first operation following a total taking operation and therefore will serve to consecutively enumerate each series of items. When the bar or pitman 65 moves down, the lug 69 will engage the detent 101 rearwardly of the shoulder 110, which projects forwardly of the rear edge of the slot portion 108 and will depress the detent without being held, and will move into normal position in the horizontal slot portion 107 in a rearward direction to the rear end thereof as the bar 65 is drawn or swung rearwardly by the spring 83 acting on the finger 75 and the foot 80. Obviously, the numbers may be substituted by any consecutive marking or character which will identify the items or transactions as indicated with a certain sale. In addition to the dating thereon simultaneously with the numbering action by means of the manually adjusted date printing disks, the characters of which are impressed on the paper in unison with the impression of the number and if desired, the item, owing to the fact that the impression block 55 extends entirely across the characters of the dating disks as well as the numbering disks, as seen particularly in Figures 2 and 3 of the drawings. The advancement of the numbering disks and the adjustment of the dating disks have already been described and further description thereof is deemed unnecessary.

After the printing of the number and date and the advancing of the numbering disks to present the next consecutive number, character or other identifying mark, the crank handle is released and moves rearwardly under the usual spring action as set forth in the previously mentioned Sundstrand patent. During this action, the members 71 move downwardly and the spring 83 immediately acts to swing the finger 75 on the pivot 74 and thus swing the bar 65 rearwardly on its pivot 66, unseating the pin 97 from the notch 68 and allowing the lug 69, after being moved downwardly in the vertical portion 108 of the right angular slot, to engage the detent 101 in rear of the shoulder 110 to depress the detent to move rearwardly in the horizontal portion 107 from the position shown in Figure 7 to the position shown in Figure 6, and subsequently to the position shown in Figure 5. In this manner, the parts will again be set so that after printing a series of items and the total, the number may be advanced in the manner described. The detent 101 permits free forward movement of the bar 65 and the lug 69 and the mounting of the bar permits it to slide longitudinally and horizontally, as well as to have sliding and slight pivotal movement to compensate for the movement of the bar 65 in an arc on the pivot 66 as an axis, will insure proper engagement of the pin 97 with the notch 68 upon forward movement of the bar 65 so that the number may be advanced when the bar is elevated. This construction and arrangement also insures disengagement of the pin from the notch when the bar 65 moves rearwardly and after the printing action and the advancing of the number, thus insuring consecutive enumeration of the series of items which the machine is manipulated to produce.

In the form of the invention shown in Figures 14 and 15 of the drawings, the mechanism is so constructed as to print the date and number only after manipulation of the total key and during the printing of a total. In this novel embodiment of the invention the parts are constructed as heretofore described, except that instead of raising the bar 65 from the members 71 after depression of the total key and operation of the crank 41 thereby requiring the intervention or manipulation of the operating handle or crank or other operative parts of the printing mechanism exclusive of the keys, in the actual advancing of the number, the bar 65 is swung forwardly directly upon the depression of the total key. For this purpose an arm 111 is pivoted at 112 to the link 48, and has a projection 113 extending upwardly therefrom, the arm normally resting upon a pin 114 projecting laterally and outwardly from the bar 65. The keyboard is provided with a guide frame 150, corresponding to the element 51 of said Sundstrand patent, and the keys of the machine are designated at 115, including a total key 116, the shank or stem 117 of which operates through the guide frame 150 and has an apertured lug or ear 118 projecting outwardly therefrom to receive an arm 119 fixed as shown at 120 to the adjacent end of a rod 121 pivoted in spaced upright plates 122 of the keyboard. The horizontally extending rod 121, projects out beyond the left side of the keyboard and has fixed thereto, at 123, an arm 124 disposed substantially at a right angle with respect to the arm 119. In the position of the machine illustrated in the drawings, the arm 119 extends horizontally in front of the rod 121, while the arm 124 extends downwardly. A link 125 is pivotally connected at this forward end to the free or lower end of the arm 124 as indicated at 126, and the rear end of the link 125 is pivotally connected as indicated at 127 to an upright pivotal support or bar 128 pivoted at its lower end as indicated at 129 on an upright bracket 130 mounted to swing on the pivot 129 in a vertical plane. The upper end of bar 128 is provided with a longitudinal slot 131 receiving the pin 114, and the arm 111 operates between the bar 65 and the bar 128, although the bar 128 and arm 111 may engage separate pins, not shown, if desired. It will thus be seen that upon depressing the total key 116, the parts will move from the full line positions shown in Figure 14 to the dotted line positions shown therein, the arm 119 moving downwardly and through the rod 121, swinging the arm 124 forwardly. This action will draw the link 125 forwardly and swing the bar or arm 128 on its pivot 129 so as to move the bar 65 from the full line position shown in Figure 14 to the dotted line position shown therein, to latch the stud 69 behind the shoulder 110 on the detent 101. In the normal positions of the parts prior to depressing the key 116, the catch 113 will move with the link 48 without contacting with the lower end of the lever 58, but upon the bar 65 being raised together with the pin 114, after the link 125 and bar 128 have been actuated to set the bar 65 in its forward position, the catch 113 will be positioned as shown in dotted lines in Figure 14 and when the link 48 moves forwardly upon the release of the crank handle, the catch 113 will engage the lower end of the lever 58 and cause an impression of the numbering and dating means in the same manner as heretofore described in connection with the other novel embodiment of the invention. In this form of the device, it will be seen that the numbering device will be advanced only upon depression of the total key to take a total of the items and thus the consecutive numbering operation will only take effect after the printing of a total for a series of items.

Depression of the total key 116, to latch the bar 65 behind a detent 101, also shifts the slidable connecting bar 92 to the right (Fig. 6) and tensions the spring 94. To prevent the stud 97 from passing into the notch 68 on its upward movement, the bar or pitman 65 is provided with a pair of pins 132 and a plate 133 is provided with slots 134 slidably engaging the pins while the plate 133 is normally held in an upward position by a retractile spring 135 connecting the upper end of the plate to the bar 65. The plate is disposed to slide against the inner face of the bar and is provided with an offset at its lower portion projecting from the forward edge of the bar, while a notch 136 is provided in the narrower portion of the plate contiguous with the upper end 137 of the offset portion thereof. Thus, it will be seen that if the bar or pitman 65 is moved forwardly, when the crank is actuated to raise the link 42 and the bar 92 through the medium of the lever 87 which is slidably connected to the link 42, the pin 97 will ride upwardly along the projecting edge of the plate 133 and will be prevented from dropping into the notch 68 and raising the bar or pitman 65 when an item or total is being printed. It is absolutely necessary at this time that the type or disks remain stationary so that the numbering device will not be advanced during the printing operation. Upon the downward movement of the bar 92 while the crank is moving rearwardly after being released from its forward position, the pin 97 will engage the upper end or shoulder 137 of the plate 133 and depress or slide the same downwardly against the action of the spring 135 until a notch 136 registers with the notch 68, the slots 134 permitting the necessary movement of the plate 133, so that when the notches are aligned, the pin 97 will drop into the notches and then on the upward movement of the bar 92 after taking a total and during the next succeeding operation of the machine, the bar 92 will be elevated, the crank thus raising the bar or pitman 65 to advance the numbering mechanism. When the bar 65 moves from the position shown in Figure 5 to the position shown in Figure 6, the lug or stud 69 will move out of the horizontal portion 107 of the slot in the upright 106 and over the shoulder 110, and owing to the upward movement of the detent 101 will prevent the return of the bar 65 to a rearward position and also of the lug 69 into a horizontal slot portion 107. The lug is then in position to move upwardly in the vertical portion 108 of the slot, and owing to the tension of the bar 65 resulting from the action of the spring 94 drawing rearwardly on the bar 92 and pin 97, the lug 69 will engage the rear edge of the vertical portion 108 of the slot and it will be seen from Figures 5, 6 and 7 of the drawings that when the bar 65 moves downwardly upon the release of the crank, the downward swinging movement of the bar 92 with the link 42 as shown in Figure 7, the lug 69 will engage the top edge of the detent 101 rearwardly of the shoulder 110 to force the detent downwardly and then pass into the horizontal slot portion 107. If the lug 69 engages in front of the shoulder 110 instead of in rear of it, it could not pass rearwardly into the slot 107 and thus it is essential that the lug 69 be retained to the rear edge of the vertical portion 108 so that it may return to its normal position as shown in Figure 5 and thereby permit the printing of the various items or series of items and the taking of the total and the numbering means is advanced.

When the lug 69 moves into the horizontal slot 107, and the link 65 is restored to its normal position, the notches 68 and 136 are withdrawn from the stud 97 and such withdrawal releases the plate 133 to the action of its spring 135 to return the plate to its normal position.

From the foregoing, it will be manifest that instead of the salesman or clerk writing down the prices or items and adding the same mentally on a separate slip and then issuing a sales-slip or check from a cash register as at present practiced, the use of a cash register merely for issuing a check, will be obviated and mistakes extended to such calculations prevented. When a sale is made, the clerk will operate the adding machine or other machine for this purpose, and print the items, after which the same will be totalized thus giving an accurate sum of the various items. It may be stated that a single roll or strip of paper may be employed in the machine, or a double strip, part of which remains in the machine as a record and other portions of which are torn off as issued from the machine to give to the purchaser or customer and thus presented to the cashier for payment. This sales-slip or check may be compared with the rolled strip record in the machine and in this way an accurate account of sales or their transactions may be conveniently kept and totals readily audited.

It will now be apparent that I have devised a novel and useful numbering and dating attachment for an adding machine and sale and cash register which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention what I claim as new and desire to secure by Letters Patent, is:—

1. In a machine of the class described, the combination of a consecutive numbering means, driving means therefor operable during every operation of the machine, and means for causing the driving means to be connected to the consecutive numbering means during total taking operations for advancing the consecutive numbering means one unit during the next succeeding operation of the machine.

2. In a machine of the class described, the combination of a consecutive numbering means, a rockable driving means therefor actuated during every operation of the machine, and a device operated only during total taking operations for causing the consecutive numbering means to be connected to the rockable driving means as the driving means reaches its home position, for advancing the consecutive numbering means one unit during the next succeeding operation of the machine.

3. In a machine of the class described, the combination of a consecutive numbering means, a rockable driving means therefor, a spring actuated member slidable on the rockable means to connect the rockable driving means to the consecutive numbering means, and means to restrain the slidable member to prevent the connection between the rockable driving means and the consecutive numbering means until during a total taking operation.

4. In a machine of the class described, the combination of a consecutive numbering means, a link pivoted thereto, a rockable driving means for operating the consecutive numbering means, a slidable member mounted to move relative to the rockable means and to rock therewith, said slidable member adapted to connect the rockable means to the slidable means, means for moving the link into position to be engaged by the slidable member during total taking operations, and means for holding the link in position in engagement with the slidable member until the next item is entered for causing the link to be operated to enter one unit into the consecutive numbering means.

5. In a step by step counter operating mechanism; the combination with a substantially vertically disposed operating bar, and a main operating link; of a driving lever having its free end bent at right angles to embrace said link; and a connecting bar adapted to rock with said lever but slidable longitudinally thereof to connect the driving lever to the operating bar.

6. In a step by step counter operating mechanism; the combination with a substantially vertically disposed operating bar; and a main operating link; of a driving lever having its free end bent at right angles to embrace said operating link; a connecting bar carried by the lever, adapted to rock with said lever and slide longitudinally thereof to connect the driving lever to the operating bar; and a pivoted double crank arm, one arm of which embraces the operating bar to swing it into operative connection with the driving lever.

7. In a step by step counter operating mechanism; the combination with a vertically disposed operation bar; and a main driver;

of a driving lever having its free end bent at right angles to embrace the main driver; a connecting bar rockable with the operating lever and slidable longitudinally of said lever to connect the operating bar to the driving lever; a pivoted double crank arm, one arm of which embraces the operating bar to swing said bar into operative connection with the driving lever; and a vertically reciprocable member operable on certain operations to rock the double crank arm to effect said connection.

8. In a step by step counter operating mechanism; the combination with a vertically disposed operating bar and a main operating link; of a driving member for said bar and having its free end bent to embrace said link; a connecting bar slidably supported on the driving member and having a stud thereon adapted to engage a notch in the operating bar; means to rock the operating bar to engage the notch therein with the stud on the connecting bar; a plate carried by the operating bar to prevent such engagement upon the upward movement of the driving member and to permit such engagement on the downward movement of the driving member; and a pawl to hold the operating bar in its moved position until after the connection has been effected.

9. In an item counter operating mechanism; the combination of a counter operating bar; a driving lever for said operating bar; a slidable connecting bar adapted to rock with the driving lever to actuate the operating bar; means for moving the operating bar to effectively connect it with the driving lever; and a plate mounted on said operating bar for movement to first prevent and then permit the connection between the operating bar and the driving lever.

CHARLES H. TOWERS.